Feb. 17, 1953 — J. H. GUNNING — 2,628,801
GOLF BAG CARRIER
Filed Aug. 2, 1948 — 2 SHEETS—SHEET 2
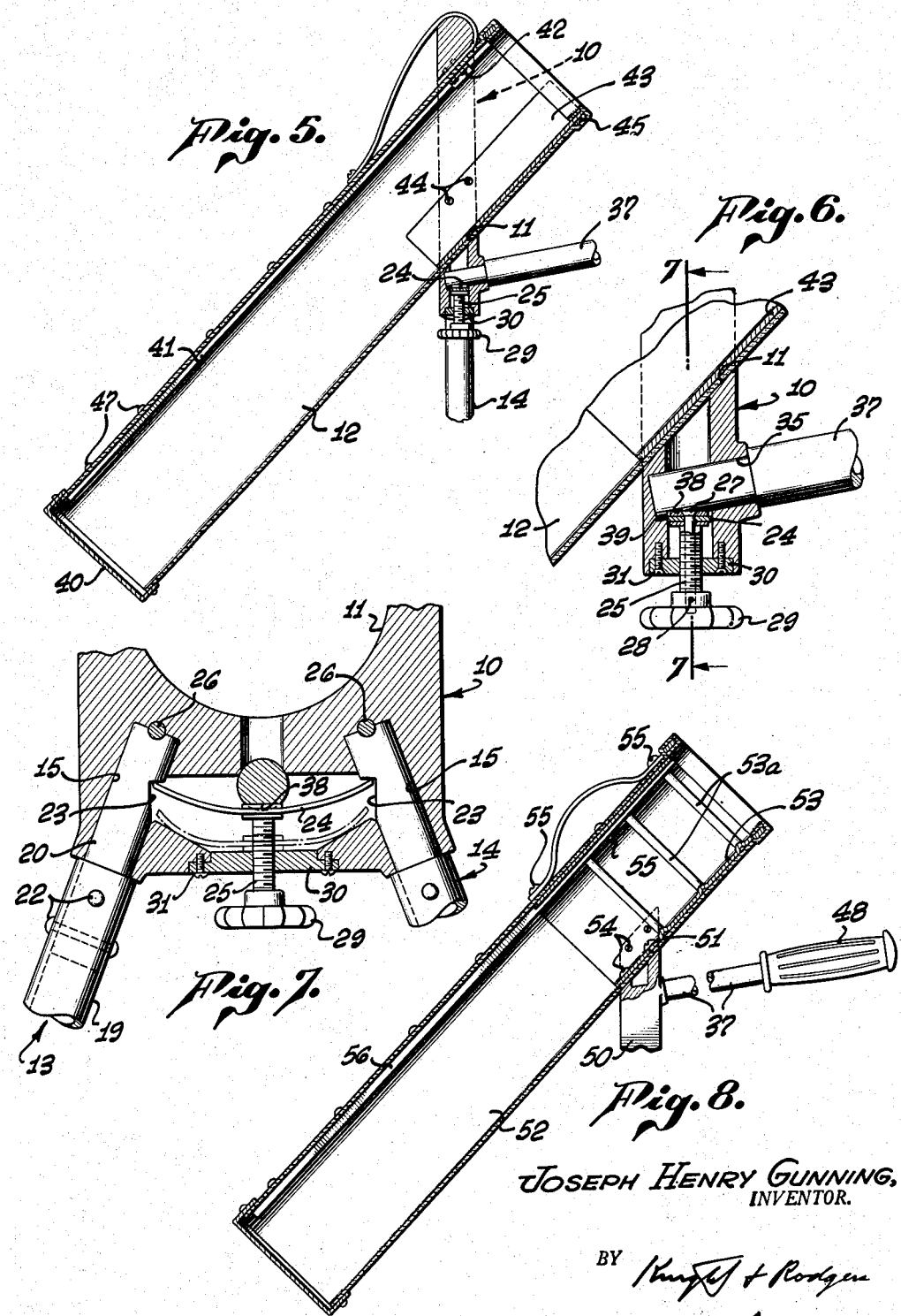
JOSEPH HENRY GUNNING,
INVENTOR.
BY Knight & Rodgers
ATTORNEYS.

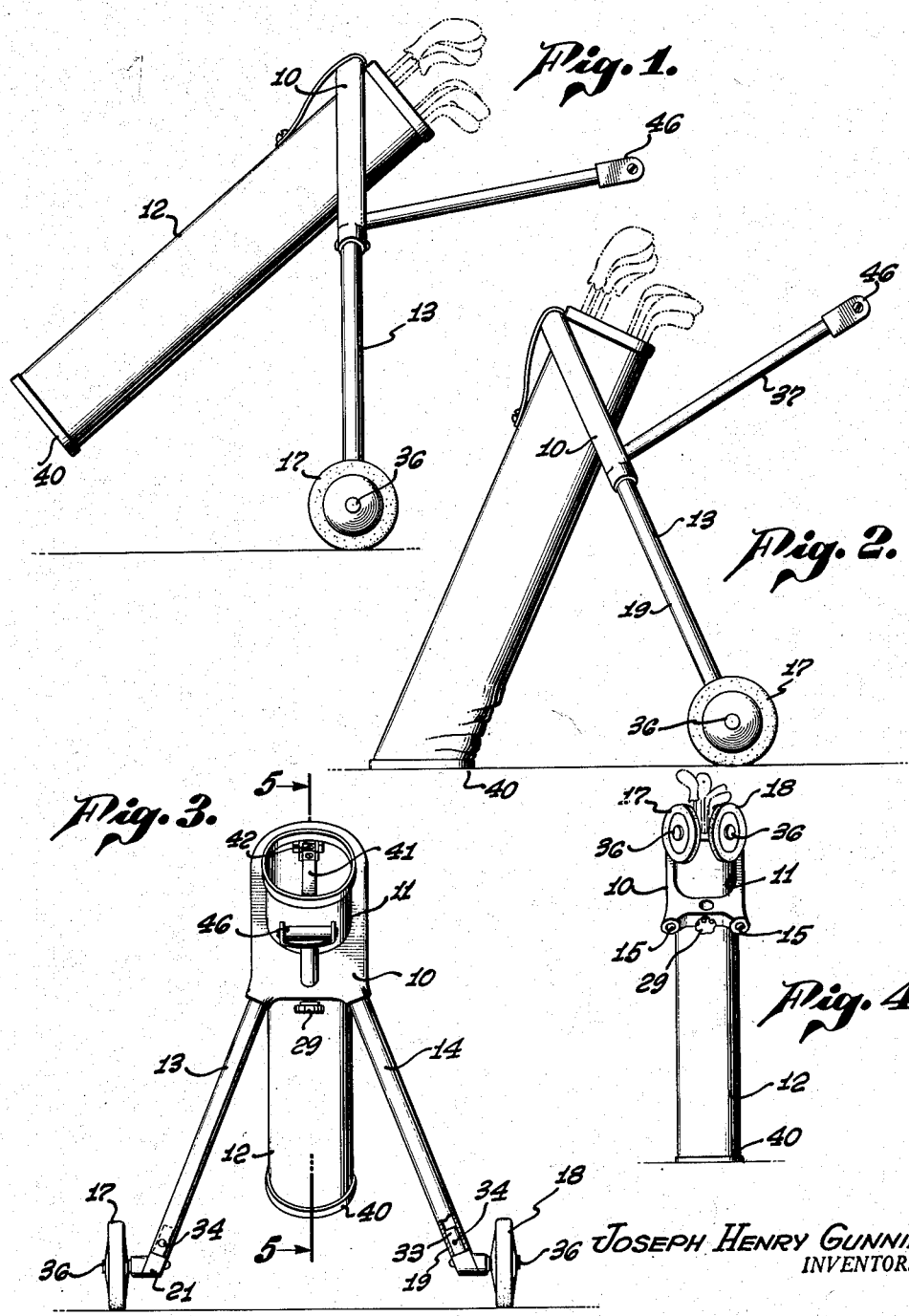

Patented Feb. 17, 1953

2,628,801

UNITED STATES PATENT OFFICE 2,628,801

GOLF BAG CARRIER

Joseph Henry Gunning, Manhattan Beach, Calif.

Application August 2, 1948, Serial No. 41,911

8 Claims. (Cl. 248—96)

The present invention relates generally to a cart, and more particularly to a golfer's cart upon which a golf bag can be mounted for optimum balance and wheeled support of the bag and its load of clubs for towing and for holding the bag in supported position on the golf course, and is adapted to removal of the wheeled support to facilitate transporting the bag when not on the golf course.

Numerous devices have been developed in the past for supporting a golf bag in propped-up condition on the links so that a player can carry his own bag without the necessity of laying it down on the ground and picking it up again at each stroke. Also numerous golf bag transporting carts have been available in recent years, but many of such devices have been relatively heavy, cumbersome to handle when transporting to and from the golf course, and expensive to manufacture.

An object of the present invention is to make an improved golf bag supporting cart.

Another object is to make a golfer's cart which is adapted to receive a golf bag in a frame on which wheeled supports and a handle are removably mounted.

Another object is to connect wheeled supports to a golf bag by removable means, the wheeled supports having elongated supporting elements adapted to fit, like golf clubs, into the bag for transporting off the golf course.

Another object is to mount a longitudinally stiffened golf bag on a supporting frame having a pair of support struts releaseably secured thereto to form, with the stiffened bag, a supporting tripod, adapted to hold the bag in a position in which clubs can be easily removed or inserted during play.

Another object is to make a golfer's cart having a frame adapted to support a golf bag, a pair of elongated wheeled supports and a handle being removably secured to the frame by a single securing arrangement whereby the wheeled supports and handle are removable for insertion, like golf clubs, in the golf bag.

Another object is to make a golfer's cart with elongated wheeled support struts assembled from a plurality of endwise assembled units which are demountable for shortening, and which may then be reassembled, to balance the assembly when in towing position according to the height of player.

In order to attain these objects, there is provided, in accordance with one arrangement of the invention, a frame of light stiff material having an area thereof formed to encircle partially or completely a golf bag and to support a golf bag, the bag being secured to the frame. A pair of leg support sockets and a handle socket are provided in the frame, the leg sockets being at acute angles to the longitudinal axis of the bag and to each other. Fastening means is provided removably to secure a pair of elongated wheeled support legs or struts and a handle in the sockets in the frame, the wheeled supports and handle being insertable in the golf bag when removed from the frame.

These and other features of the invention will be brought out in the following description and the accompanying drawings, comprising two sheets.

In the drawings:

Fig. 1 is a side elevational view of a golf bag mounted on a cart embodying the present invention, a plurality of golf clubs being indicated in the bag, in dot-dash lines, the cart and bag being shown in position for wheeling the cart around the golf course;

Fig. 2 is a similar view to Fig. 1 showing the rest position with the bag bottom resting on the ground;

Fig. 3 is a front elevational view of the device as shown in Fig. 1;

Fig. 4 is a front elevational view at reduced scale of the device as it appears with wheeled support struts and handle removed and stowed in the bag for transport off the golf course;

Fig. 5 is a longitudinal vertical sectional view at enlarged scale of the device, the lower portions of the wheeled support struts being broken away;

Fig. 6 is a further enlarged fragment of the sectional view of Fig. 5, showing the handle and support strut locking mechanism;

Fig. 7 is an enlarged fragmentary vertical sectional view taken on the plane of line 7—7 of Fig. 6, the handle and strut locking mechanism being shown in releasing position in dot-dash lines; and Fig. 8 is a fragmentary longitudinal vertical sectional view of a bag having a modified mounting arrangement and handle from that illustrated in Fig. 5, the lower portion of the frame being broken away.

Referring to the structure illustrated in Figs. 1 to 7 inclusive, a generally planiform narrow frame 10 is of stiff, light and strong material, such as cast aluminum or magnesium alloys, or a suitable plastic. The frame has a saddle or opening 11 therein of a size and shape to receive and at least partially to encircle a golf bag of a usual or desired size and shape. The saddle or opening is preferably formed to define a diagonal section through the bag to be mounted therein. The particular frame illustrated is shaped to receive a light, round, golf bag 12 of canvas or other similar material. However, my invention is not limited to any specific size or shape or type of golf bag as the frame can be designed to hold any desired bag. The wall of opening 11 in the frame illustrated thus has an oval or eliptical shape, and the longitudinal axis of the opening is disposed at an acute downward and rearward angle relative to the principal plane of the frame, as shown in Figs. 5 and 6.

A pair of socket openings 15 are provided in the bottom of the frame 10 to receive the upper ends of a pair of wheeled support struts 13 and 14 telescopically therein. The axes of the sockets are in the median plane of the frame 10, or are at least substantially parallel thereto, but converge toward their upper ends; and the wheeled struts 13 and 14, fitted therein, and frame 10 form a supporting wheeled bipod for towing the device on the links. Consequently, the axes of struts 13 and 14 lie in a common plane which is preferably parallel or coplanar to the median plane of frame 10, and which intersects the longitudinal axis of the bag at an acute angle. Supporting wheels 17 and 18 are pivoted on horizontal axles at the lower ends of the struts 13 and 14 respectively, and are well spaced to provide adequate lateral stability for the device.

Each strut preferably has a light, strong, main tubular body portion 19 with upper and lower end fittings 20 and 21 respectively mounted thereon. Each upper strut fitting 20 is preferably of the same outer diameter as the internal diameter of the tubular strut body 19, into which it is inserted, as shown in Fig. 7. Through rivets 22 secure each upper fitting 20 to its tube. The lower or wheel mounting fittings 21 are secured to the lower ends of the struts 13 and 14, as shown in Fig. 3. These fittings 20 and 21 may be of hardwood or other suitable material such as aluminum or magnesium alloys or plastic as desired. If desired, solid rods may be used in place of the hollow tubes, in which case fittings 20 and 21 can be eliminated as separate members for the ends of such rods can be inserted directly into sockets 15 in frame 10 and the axles for wheels 17 and 18 can be attached directly to the rods.

Each of the wheel mounting fittings 21 has an upper portion 33 of a diameter to fit telescopically within the lower end of a strut tube 19. These fittings may be riveted to the strut tubes, but are preferably removably retained in position in the struts by screws or through bolts 34. Each wheel mounting fitting has an axle 36 mounted therein at an angle relative to the longitudinal axis of its strut tube, such that the axle is horizontal when in operative position. Hence wheels 17 and 18 are in substantially upright fore-and-aft position when the struts are assembled and secured on the frame 10 as shown in Figs. 1 to 3 and 7.

A notch 23 is provided in one side near the top of each upper fitting 20, the upper end of each notch being disposed in a plane transverse of the longitudinal axis of the fitting. Each notch 23 is on the side opposite to the wheel carried by the strut. The upper strut fittings are intended to be inserted in their respective sockets so that the notches 23 face inwardly toward each other as shown in Fig. 7; and when locked in this position, the wheels and axles are properly oriented to roll on the ground. Proper orientation of the struts is initially secured and also retained by a pin 26 at the upper end of each socket 15. The frame is preferably assembled with the struts 13 and 14 properly oriented. Then two holes are drilled in the frame, each to intersect the upper end wall of one socket 15 and the end of the fitting 21 therein. A tight pin 26 is driven into each hole; and it serves to secure and maintain proper positioning of the strut fitting when seated in the socket.

Anchoring means for securing the upper strut fittings in fully inserted position in their respective sockets is shown in Figs. 5, 6, and 7 and comprises a leaf or flat spring 24. The spring is connected at its center to the upper end of a locking screw 25 by a headed pin 27 (Fig. 6), the shank of which passes freely through a hole in the center of the spring and downwardly into an axial bore in screw 25. The pin is secured to the bore of the screw by a through pin 28, which also secures hand wheel 29 to the lower end of the screw 25. This arrangement holds the spring closely against the upper end of the screw, but permits free rotation of the screw relative to the spring. As seen in Fig. 6, spring 24 is the full transverse width of the interior opening in frame 10, at least at the center portion. This not only holds the spring against turning when the screw 25 is turned, but also provides a bearing against the body of frame 10 to take the pull on the towing handle, described below.

The screw has threaded engagement with a threaded bore in the bottom of the frame 10. Since the frame is ordinarily of a material so soft as to be unsuitable for long continued threaded support of the screw 25, a threaded insert plate 30 of steel or other suitable material is preferably provided and secured to the lower side of the frame, as by screws 31, as in Figs. 6 and 7. The opening closed by plate 30 is of a size to permit insertion of leaf spring 24 into the interior of frame 10.

To free the struts, the screw 25 may be screwed outwardly to the dot-dash position of Fig. 7. This draws the spring downwardly to the dot-dash position of Fig. 7, and moves the outer ends of the leaf spring 24 clear of the notches 23 in the upper strut fittings 20. This permits insertion or withdrawal of the upper strut fittings relatively to their sockets.

After the upper strut fittings 20 are inserted in their respective sockets with their notches 23 facing inwardly toward each other, the screw 25 may be rotated to advance it to the solid line position of Fig. 7, at which time the ends of the leaf spring 24 enter and engage notches 23, thereby securely retaining the struts in position in their respective sockets. Continued rotation of the screw 25 after the ends of spring 24 first seat in the transverse end faces of notches 23 tends to straighten the bowed spring, thereby forcing its ends outwardly into tighter gripping engagement with the notches 23.

A handle receiving socket 35 is provided in the frame 10, as best shown in Fig. 6, to receive the rearward end of a removable towing handle 37 therein. The axis of the handle socket is disposed in a slightly upward and forward direction relatively to the plane of the frame 10 when the frame is upright as illustrated in Figs. 5 and 6.

The inner end of the handle 37 has a notch as at 38 with an end wall 39. When the locking screw 25 is advanced to raise spring 24 into strut gripping position as illustrated in Fig. 6 and in solid lines in Fig. 7, the top central portion of the spring is also forced into notch 38 in the handle. This engagement anchors the handle securely in its socket. When the locking screw 25 is retracted to the dot-dash line position of Fig. 7 to free the wheel struts, the towing handle is also freed for removal by the withdrawal of the spring to clear the end 39 of the notch. The outer end of the towing handle may be provided with a suitable grip, such as the spade grip 46, Figs. 1, 2 and 3, or a straight grip 48, Fig. 8.

Many golf bags have sufficient longitudinal stiffness to support their own weight when mounted on a frame such as the frame 10. However where a bag of minimum weight and with flexibly connected bottom is desired, as in the structure shown in Figs. 1 to 6, inclusive, a light canvas golf bag 12 may be employed. This bag has a stiff, wear-resistant bottom 40 of sole leather or other suitable material mounted thereon. A longitudinal stiffener stay 41, which may be of strong straight-grained hardwood, metallic tubing, or other suitable material, is secured lengthwise inside and along the upper side of the bag, as by rivets or screws 47, as it appears in Figs. 1, 2, 3 and 5. This stay is suitably secured to the frame 10 as by screws 42 so that the stiffened bag forms one leg of a supporting tripod when the device is tilted rearwardly as shown in Fig. 2. In this position the wheeled struts comprise the other two legs of the tripod.

The center of gravity of the cart with a load of clubs thereon, when thus supported on the tripod is located well within the triangle defined by the base of the tripod. The bag of clubs, therefore, is supported in stable upright position to facilitate selection, withdrawal and replacement of clubs by a player using the device.

The legs or supporting struts 13 and 14 are inclined to the longitudinal axis of the bag when mounted on the frame, so that when the cart, with its load of clubs is tilted forwardly to towing position, as in Fig. 1, the center of gravity is substantially over the wheels. Such a condition of balance makes for maximum ease in towing the loaded cart.

A bag stiffening plate 43, curved to conform to the interior of the golf bag, is secured, in the embodiment illustrated in Fig. 5, inside the lower side of the bag to overlie the frame 10. It is secured to the frame by screws 44, and extends from the frame 10 forwardly to the mouth of the bag. This plate supports the usual stiffener ring 45 around the mouth of the bag and prevents it from sagging down as it would tend to do without the stiffener plate 43.

No stiffening means are shown along the lower side of the bag near its base, so that when the device is tilted back to rest on the bottom of the bag, the bottom of the bag tends to lie flat along the ground as shown in Fig. 2. This distributes the wear which otherwise would be concentrated on the lower edge of the bag bottom 40.

The modified construction shown in Fig. 8 is the same as described above, except for a change in the frame to omit the upper portion passing over the bag and the addition of an internal stiffener inside the bag to take over the function of the omitted frame part. The upper side of a bag mounting frame 50 is concavely curved to form a sloping saddle 51 whereon a golf bag 52 is adapted to rest. A stiff sleeve 53 of a size and shape to fit closely into the golf bag is inserted therein to provide stiffening means entirely around the interior of the bag. This sleeve is secured to the saddle portion 51 of the frame as by screws 54. Sleeve 53 may have circumferential ribs 53a, as shown, to add to its rigidity.

In the first form described, the upper part of the loop in the frame through which the bag passes supports, at least in part, the upper portion of the bag and holds it open. In the form of Fig. 8, this support for the bag is afforded entirely by the sleeve 53. The sleeve amounts to an extension of plate 43 into a closed figure to increase its supporting power. The latter construction has the advantage of being lighter and easier to make, and easier to adapt it to any specific bag. For most satisfactory construction, the cart will be designed to accommodate a particular bag or bags sold with the cart; but my invention is also adaptable, by changing the size and shape of sleeve 53, to various bags that may already be owned by purchasers of the cart alone. As an alternate construction, the sleeve can be placed outside the golf bag.

As shown in Fig. 8, a stiffening stay 56 similar to the stay 41 previously described may be provided along the entire length of the upper side of the bag. It is fastened to sleeve 53 by bolts or rivets 55. If desired, stiff material, such as sole leather, plastic sheet or even sheet metal, may be substituted for the canvas of the bag illustrated. In such cases no extraneous stiffening means would be required.

In the matter of balance, the exact position of the center of gravity varies with the weight of the bag and the number and weight of clubs. It may be easily visualized from Fig. 1, that the lighter the bag, and the more clubs there are in the bag, the further forward will be the center of gravity of the device when loaded with clubs and tilted into position for towing. Ideally the center of gravity is directly over the wheels when the struts are vertical, as in Fig. 1. To obtain this relation, the center of gravity is located as close as possible to the plane of the axis of struts 13 and 14; but in any given case that plane may be slightly inclined to the vertical when the center of gravity is in a vertical plane passing through the point of ground engagement of wheels 17 and 18.

In order that each player can have his own cart balanced for maximum ease in drawing it about the golf course, the wheel strut tubes 19 preferably are supplied by the factory in a maximum length to suit an extreme case of a tall player carrying a light load of clubs in a heavy bag. Such a condition would require tilting the cart well forward to balance the load and the handle would have to be high to suit such a tall player.

From this initial extreme condition of strut length, each player can test the balance of the cart with his own choice of bags mounted thereon and carrying his usual load of clubs. With the device balanced under these conditions the player then decides on the handle height he desires for towing the cart. Then, by removing one of strut fittings 20 or 21, cutting off the struts to lower the handle to such desired height, and again securing the strut fittings properly in position, each player is assured of maximum ease and comfort in towing his bag of clubs about the links. Minor variations in balance can also be secured by slightly bending the towing handle.

For transporting the bag load of clubs off the links, as in automobiles, on trains and the like, the wheel struts and handle are removed as above set forth, and inserted in the bag like so many golf clubs, the wheels overhanging the mouth of the bag as shown in Fig. 4.

The device is light and easy to transport, comprises substantially an integral component of the bag itself, and adds very little to the weight or inconvenience when transporting the clubs off the golf course. The entire assembly is extremely attractive in its airplane type appearance, and can be easily set up and dismounted by any golfer. It has no adjustments which are apt to get out of order, and may be fitted readily to the varying requirements of each individual owner and his particular load of clubs.

In its broader aspects, my invention is independent of the nature of the golf bag and of the specific means used to reinforce it and to attach it to the frame, including stay 41 and plate 43 or the equivalent devices. Hence it will be understood that the shape, size, and location of the reinforcing or stiffening members and the attachment means may be varied to suit the bag being used and may depart from the presently preferred forms shown and described.

While I have illustrated and described a preferred form of my invention and some modification thereof, it will be apparent to those familiar with the art that the device is capable of other modifications without departing from the spirit and scope of the invention as set forth in the following claims.

I claim:

1. In a golf bag cart, the combination comprising: a central, rigid, unitary frame; walls forming a cavity within said frame; means forming a pair of oppositely disposed upwardly converging sockets in said frame, each said socket intersecting said cavity to provide oppositely disposed openings communicating therewith; means forming a third socket in said frame extending substantially normal to the common plane of said first two sockets and intersecting said cavity to provide a lateral opening communicating therewith; a strut arranged in each of said sockets and each having a portion thereof exposed in said cavity for contact with locking means; an elongate, generally horizontally located locking bar in said cavity with its free ends located beneath the adjacent exposed portions of the struts in said first two sockets and with its central portion located beneath the strut in said third socket; and screw threaded vertically adjustable means extending upwardly into said cavity thru the bottom wall thereof and engaged with said locking bar to adjustably urge said bar upward into contact with all of said struts to lock them in position in said frame.

2. The combination as claimed in claim 1, in which the inner end of each strut is formed with a locking notch in a side thereof, and said locking bar is adapted to engage said notches to provide a positive locking engagement.

3. Support structure for a golf bag cart comprising: a central, rigid frame; walls, including a bottom wall, forming a cavity within said frame; means forming a pair of strut-receiving sockets extending upwardly and inwardly into said frame and intersecting said cavity to provide oppositely disposed openings communicating therewith above said bottom wall; means forming a handle-receiving socket extending into said frame in a direction substantially normal to the plane of said strut-receiving sockets and intersecting said cavity above said bottom wall; struts arranged in said first sockets and a handle arranged in said third socket, with portions of each exposed within said cavity; an elongate, generally horizontally arranged, upwardly concave, resilient locking bar lying adjacent to said bottom wall; and adjustable means carried by said bottom wall to urge said bar upwardly to cause its free ends to engage said struts and to spring its central portion upwardly into engagement with said handle; whereby said struts and handle are securely locked in assembled relation with said frame.

4. Support structure for a golf bag cart comprising: a central, rigid frame; walls, including a bottom wall, forming a cavity within said frame; means forming a pair of strut-receiving sockets extending upwardly and inwardly into said frame and intersecting said cavity to provide oppositely disposed openings communicating therewith above said bottom wall; a strut located in each of said sockets with its inner end extending into said cavity to provide a laterally exposed side portion; a horizontally arranged locking bar having a retracted position adjacent to said bottom wall; and adjustable means carried by said frame and attached to said locking bar; said means being adjustable upwardly to urge said locking bar upwardly and cause the free ends of said bar to engage the side portions of said struts to lock them in assembled relation with said frame.

5. The combination as claimed in claim 4, in which said locking bar is an elongate upwardly concave resilient member and said adjustable means produces an upward force on the medial portion of said bar tending to straighten same and increase its locking force on said struts.

6. Support structure for a golf bag cart, comprising: a rigid frame; wall means forming a cavity within said frame; means forming a pair of converging sockets extending through said frame and communicating with said cavity; a strut slidable in each socket with its inner end extending into said cavity; a locking member located in said cavity between said inner strut ends and adjacent to one of said wall means; and support means for said locking member carried by said frame and adjustable to urge said locking member away from said one wall means and into engagement with said strut ends to lock them in assembled relation with said frame.

7. Support structure for a golf bag cart, comprising: a rigid frame; wall means forming a cavity within said frame; means forming a plurality of sockets extending thru said frame and communicating with said cavity; a strut slidable in each socket with its inner end extending into said cavity; a locking member located in said cavity and having a retracted position adjacent one of said wall means and spaced from each of said inner strut ends; and support means for said locking member carried by said frame and adjustable to urge said locking member away from said one wall means and into engagement with said strut ends to lock them in assembled relation with said frame.

8. The combination as claimed in claim 7, in which said locking member is formed of resilient material to equalize its locking engagement with said plurality of strut ends.

JOSEPH HENRY GUNNING.

REFERENCES CITED

The following references are of record in the file of this patent:

UNITED STATES PATENTS

| Number | Name | Date |
|---|---|---|
| 1,266,104 | Carlsberg | May 14, 1918 |
| 1,365,873 | Waderlow | Jan. 18, 1921 |
| 1,496,465 | Jackson | June 3, 1924 |
| 1,513,092 | Davis, Jr. | Oct. 28, 1924 |
| 1,599,786 | Overand | Sept. 14, 1926 |
| 1,890,362 | Bellow | Dec. 6, 1932 |
| 2,352,496 | Rose | June 27, 1944 |
| 2,399,518 | Strain | Apr. 30, 1946 |
| 2,422,298 | Freis | June 17, 1947 |

FOREIGN PATENTS

| Number | Country | Date |
|---|---|---|
| 236,390 | Great Britain | July 9, 1925 |
| 555,973 | France | July 10, 1923 |